(12) United States Patent
Gandhi et al.

(10) Patent No.: US 7,836,107 B2
(45) Date of Patent: Nov. 16, 2010

(54) DISK SEEK OPTIMIZED FILE SYSTEM

(75) Inventors: Shaheen Ashok Gandhi, Seattle, WA (US); Timothy Seeds Milligan, Redmond, WA (US); Logananth Seetharaman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 377 days.

(21) Appl. No.: 11/961,929

(22) Filed: Dec. 20, 2007

(65) Prior Publication Data

US 2009/0164535 A1 Jun. 25, 2009

(51) Int. Cl.
*G06F 12/00* (2006.01)
*G06F 17/30* (2006.01)

(52) U.S. Cl. ................ 707/823; 707/824; 711/173
(58) Field of Classification Search .......... 707/200, 707/823, 824, 609, 705, 999.2; 711/100, 711/173
See application file for complete search history.

(56) References Cited

U.S. PATENT DOCUMENTS

| | | | | |
|---|---|---|---|---|
| 5,566,331 | A * | 10/1996 | Irwin et al. ............ | 1/1 |
| 5,774,714 | A | 6/1998 | Thapar ............... | 395/611 |
| 5,852,705 | A | 12/1998 | Hanko ............... | 386/92 |
| 6,018,789 | A * | 1/2000 | Sokolov et al. ........ | 711/113 |
| 6,094,707 | A * | 7/2000 | Sokolov et al. ........ | 711/113 |
| 6,134,586 | A | 10/2000 | Walker ............... | 709/219 |
| 6,345,028 | B1 | 2/2002 | Jaeger ............... | 369/84 |
| 6,542,975 | B1 * | 4/2003 | Evers et al. .......... | 711/162 |
| 6,618,548 | B1 * | 9/2003 | Inoue et al. .......... | 386/52 |
| 6,714,720 | B1 * | 3/2004 | Lightstone et al. ..... | 386/46 |
| 6,839,827 | B1 * | 1/2005 | Beardsley et al. ...... | 711/206 |
| 6,874,035 | B1 * | 3/2005 | Andre et al. .......... | 709/246 |
| 6,901,206 | B2 * | 5/2005 | DaSilva ............... | 386/46 |
| 6,981,116 | B2 * | 12/2005 | Jolly ................. | 711/163 |
| 7,155,586 | B1 * | 12/2006 | Wagner et al. ........ | 711/162 |
| 7,216,170 | B2 | 5/2007 | Ludvig ............... | 709/225 |
| 7,243,365 | B1 | 7/2007 | Rahman .............. | 725/109 |
| 7,469,327 | B2 * | 12/2008 | Kawamura et al. ..... | 711/163 |
| 7,480,761 | B2 * | 1/2009 | Birrell et al. ......... | 711/103 |
| 7,519,274 | B2 * | 4/2009 | Li .................... | 386/95 |
| 7,593,973 | B2 * | 9/2009 | Lee .................. | 707/204 |
| 7,606,944 | B2 * | 10/2009 | Kalwitz et al. ........ | 710/5 |

(Continued)

OTHER PUBLICATIONS

Seltzer et al., "Read Optimized File System Designs: A Performance Evaluation", IEEE 1991, pp. 602-611, accessed online at <http://ieeexplore.ieee.org/stamp/stamp.jsp?arnumber=00131509&tag=1> on Feb. 18, 2010.*

(Continued)

*Primary Examiner*—Charles Rones
*Assistant Examiner*—Phuong-Thao Cao
(74) *Attorney, Agent, or Firm*—Woodcock Washburn LLP (57) ABSTRACT

A disk-seek optimized file system is provided that may be advantageously deployed in a computer system that supports simultaneous Digital Video Recorder (DVR) functionality and user interaction, such as recording several television (TV) shows while simultaneously supporting a video game played by a user. A computing device hard drive is logically divided into "chunks,"—a first chunk comprising volume metadata, and subsequent chunks comprising equal size "blocks." A first block of a subsequent chunk comprises block bitmaps and a stream identifier table. The block bitmaps indicate subsequent blocks in the chunk that contain stream data for particular streams, which are identified in corresponding entries in the stream identifier table.

20 Claims, 9 Drawing Sheets

U.S. PATENT DOCUMENTS

| | | | | |
|---|---|---|---|---|
| 7,660,837 | B2* | 2/2010 | Rajakarunanayake | 707/999.205 |
| 7,734,701 | B2* | 6/2010 | Dewey | 709/206 |
| 2002/0039483 | A1 | 4/2002 | Frost | 386/1 |
| 2002/0049760 | A1* | 4/2002 | Scott et al. | 707/10 |
| 2003/0061296 | A1* | 3/2003 | Craddock et al. | 709/212 |
| 2004/0107223 | A1* | 6/2004 | Uno et al. | 707/200 |
| 2004/0111756 | A1 | 6/2004 | Stuckman | 725/142 |
| 2005/0123283 | A1* | 6/2005 | Li | 386/124 |
| 2005/0207442 | A1* | 9/2005 | Zoest et al. | 370/465 |
| 2005/0268341 | A1* | 12/2005 | Ross | 726/26 |
| 2006/0123250 | A1* | 6/2006 | Maheshwari et al. | 713/193 |
| 2007/0005659 | A1* | 1/2007 | Lemoal et al. | 707/200 |
| 2008/0005206 | A1* | 1/2008 | Rajakarunanayake | 707/205 |
| 2008/0027998 | A1* | 1/2008 | Hara | 707/200 |
| 2008/0028011 | A1* | 1/2008 | Doucette et al. | 707/205 |
| 2008/0104313 | A1* | 5/2008 | Chu | 711/104 |
| 2008/0127221 | A1* | 5/2008 | Otte et al. | 719/321 |
| 2008/0281875 | A1* | 11/2008 | Wayda et al. | 707/201 |
| 2009/0013129 | A1* | 1/2009 | Bondurant | 711/115 |
| 2009/0077327 | A1* | 3/2009 | Hara | 711/154 |
| 2009/0228535 | A1* | 9/2009 | Rathi et al. | 707/204 |
| 2009/0276602 | A1* | 11/2009 | Chedru | 711/171 |

OTHER PUBLICATIONS

Kola et al., "A Fully Automated Fault-tolerant System for Distributed Video Processing and Off-site Replication," *ACM*, http://www.cs.wisc.edu/condor/stork/papers/video_pipeline-nossdav2004.pdf, 2004, 5 pages.

Kumar, M., "Video-Server Designs for Supporting Very Large Numbers of Concurrent Users," *IBM Journal of Research and Development*, http://www.research.ibm.com/journal/rd/422/kumar.html, 2000, 42(2), 1-13.

* cited by examiner

FIG. 10

DISK SEEK OPTIMIZED FILE SYSTEM

BACKGROUND

Computer file systems store data in non-volatile memory, such as a computer hard drive. Existing file systems make use of any of a wide variety of organizational approaches for physical placement of data on disk. The various approaches each have their advantages and disadvantages.

For example, a Log Structured File System (LFS) writes file system data sequentially in a log-like structure. A LFS log comprises of a series of segments, where each segment contains both data and metadata blocks. The LFS gathers a segment worth of data from active (volatile) memory and appends the segment at the end of the log. The advantages of this approach is that write performance is increased, crash recovery is relatively simple, and less checkpointing information needs to be stored.

Other file systems such as File Allocation Table (FAT), New Technology File System (NTFS), and the Second Extended File System (ext2), to name just a few, usually attempt to write data blocks at a fixed place on the disk, with great care for spatial locality, and make in-place changes to their data structures in order to perform well on magnetic disks, which tend to seek relatively slowly.

Thus file systems can be optimized according to a wide variety of considerations, including considerations related to particular hardware environments. A computer file system that provides advantages for at least one contemplated computer system arrangement is provided herein.

SUMMARY

Systems, methods, and computer readable media are provided for a disk-seek optimized file system. An environment in which embodiments of the invention may be advantageously deployed is, for example, a computer system that supports simultaneous Digital Video Recorder (DVR) functionality and user interaction, such as recording several television (TV) shows while simultaneously supporting a video game played by a user.

In one embodiment, a computer system making use of the file system comprises a non-volatile memory including a plurality of "chunks," and appropriate hardware and software for utilizing the chunks for data storage. A first chunk comprises volume metadata. Subsequent chunks comprise a plurality of equal size "blocks."

A first block of a subsequent chunk comprises block bitmaps and a stream identifier table. The block bitmaps indicate subsequent blocks in the chunk that contain stream data for particular streams, which are identified in corresponding entries in the stream identifier table.

Thus a two tiered file system structure is contemplated with volume metadata in the first chunk, and additional metadata in the first block of each subsequent chunk. The contemplated arrangement can advantageously have a small memory footprint, and minimizes disk seek time so that intensive data recording, such as video recording, can be accomplished alongside high-priority user interactive applications, such as video games.

Other advantages and features of the invention are described below.

BRIEF DESCRIPTION OF THE DRAWINGS

The systems and methods for a disk seek optimized file system in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
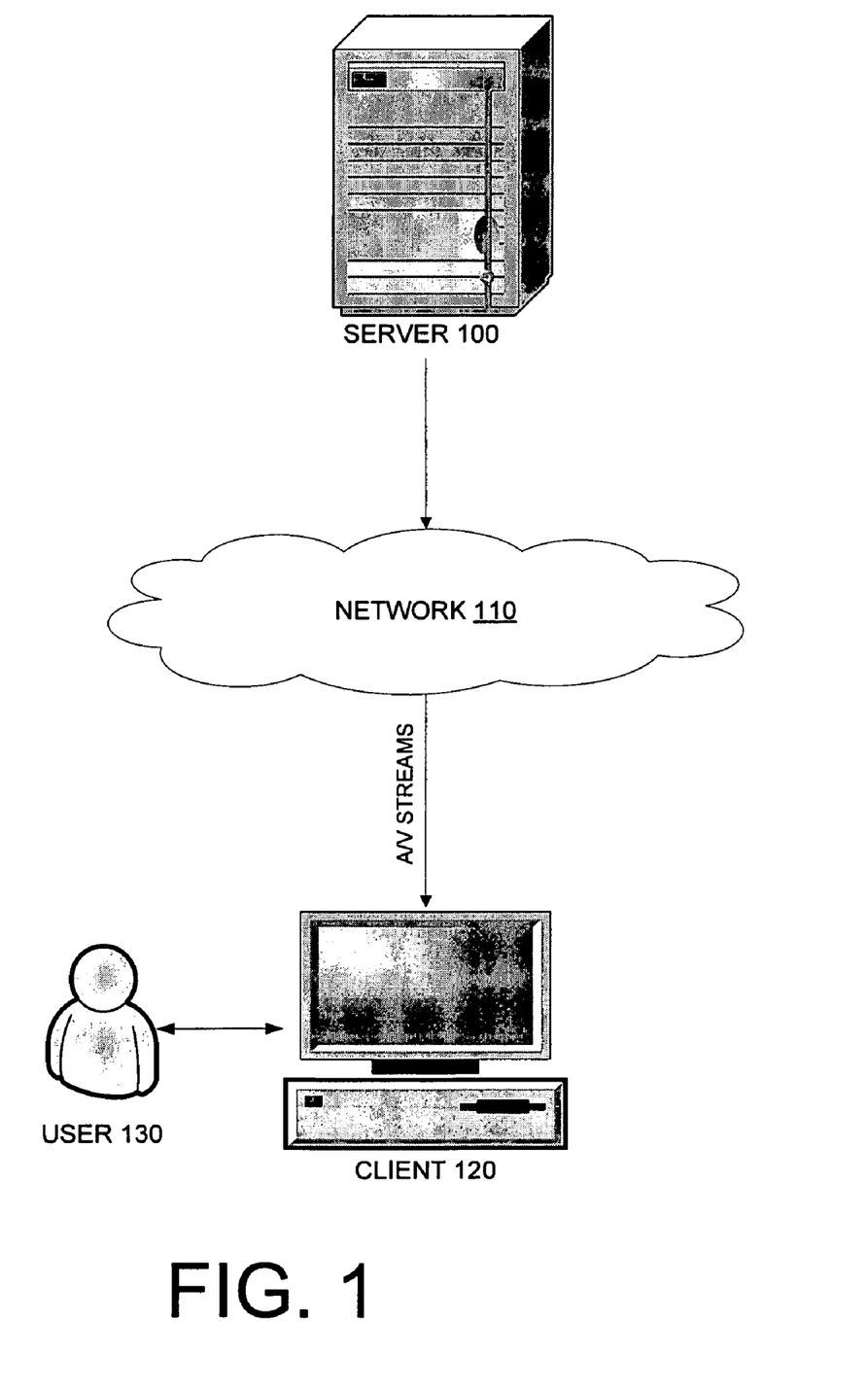
FIG. 1 illustrates a client computer system that supports simultaneous Digital Video Recorder (DVR) functionality and user interaction.

FIG. 1 illustrates an arrangement in which a user 130 of a client computer 120 receives data streams from a server 100 via a network 110. Client 120 may comprise the general hardware and software components of any of a wide variety of computer systems that run applications on behalf of a user 130. In one embodiment, the client 120 comprises the features of a video game console such as, for example, the XBOX 360® product made by Microsoft Corp., of Redmond, Wash., or the PLAYSTATION 3 made by Sony Electronics, Inc. of San Diego, Calif. Such a client 120 can process video game applications, and optionally other applications as may be useful to particular arrangements. Client 120 may also comprise the operational components of a general purpose Personal Computer (PC) running an operating system such as one of the WINDOWS® line of operating systems made by Microsoft, or another operating system such as one of the LINUX® or UNIX® line of operating systems. Client 120 may alternatively comprise the features of one of the various computer systems manufactured by Apple Inc. of Cupertino, Calif., or the features of a mobile device such as an IPHONE® also made by Apple.

In addition to the ability to process applications, client 120 may be configured to simultaneously receive and record data streams including any data. In one embodiment, client 120 is configured with appropriate hardware and software to serve as a Digital Video Recorder (DVR). Client 120 thus receives and records Audio/Video (AV) streams, typically comprising television content such as television shows, advertisements, or movies, from server 100 via network 110. In one scenario, the client 120 is configured to enable the user 130 to select certain television programs he or she wishes to record. The client 120 then automatically starts recording the selected streams at the appropriate time. The client 120 may be further configured to allow the user 130 to simultaneously record multiple programs.

Recording data streams, as client 120 does for example when it is configured to serve as a DVR, is disk-bandwidth intensive, because it requires writing a lot of data to disk. This drain on disk bandwidth presents a limitation that has not traditionally been present in video game consoles and/or general purpose computing devices, because such systems have not traditionally been configured to simultaneously function as a DVR.

In a typical computer storage system, disk bandwidth used by one application can arbitrarily affect the disk bandwidth available to other applications. On multi-tasking computers, this has not traditionally been a worrisome problem due to the nature of multi-tasking: the user makes decisions about how many and what type of tasks to perform at a time. On traditional video game consoles, games typically are allowed to assume that 100% of hardware resources are available to them at any one time, because no other significant applications run simultaneously.

When client 120 is equipped to record data streams, however, the disk bandwidth used by the DVR feature may affect the disk bandwidth available to executing applications, such as a game, as well as vice-versa. The affected disk bandwidth is dominated by the time used to seek between places on the disk used by the game and places on the disk used by the DVR. The filesystem detailed here mitigates this problem by eliminating many seeks required to update filesystem metadata as data is stored to the disk in the process of recording television.

The filesystem detailed here also has the advantage of using only a small amount of active memory. Many filesystems keep a very large amount of metadata in memory as a means of reducing the number of required disk seeks. This of course presents a drain on memory that may be needed by other memory-intensive applications, such as a graphics-intensive high definition game application. By implementing the two-tiered file system approach described herein, we limit the amount of memory required by the file system at any one time, while simultaneously supporting recording of large volumes of data.

The network 110 illustrated in FIG. 1 may implement any of a wide variety of network communications infrastructure, as will be appreciated by those of skill in the art. In general, network 110 may itself comprise computing entities that provide services to various connected computing devices, and may itself represent multiple interconnected networks.

A network infrastructure may enable a host of network topologies such as client/server, peer-to-peer, or hybrid architectures. The "client" is a member of a class or group that uses the services of another class or group. The client process utilizes the requested service without having to "know" any working details about the other program or the service itself. In a client/server architecture, particularly a networked system, a client is usually a computer that accesses shared network resources provided by another computer, e.g., a server. A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Figure 2:
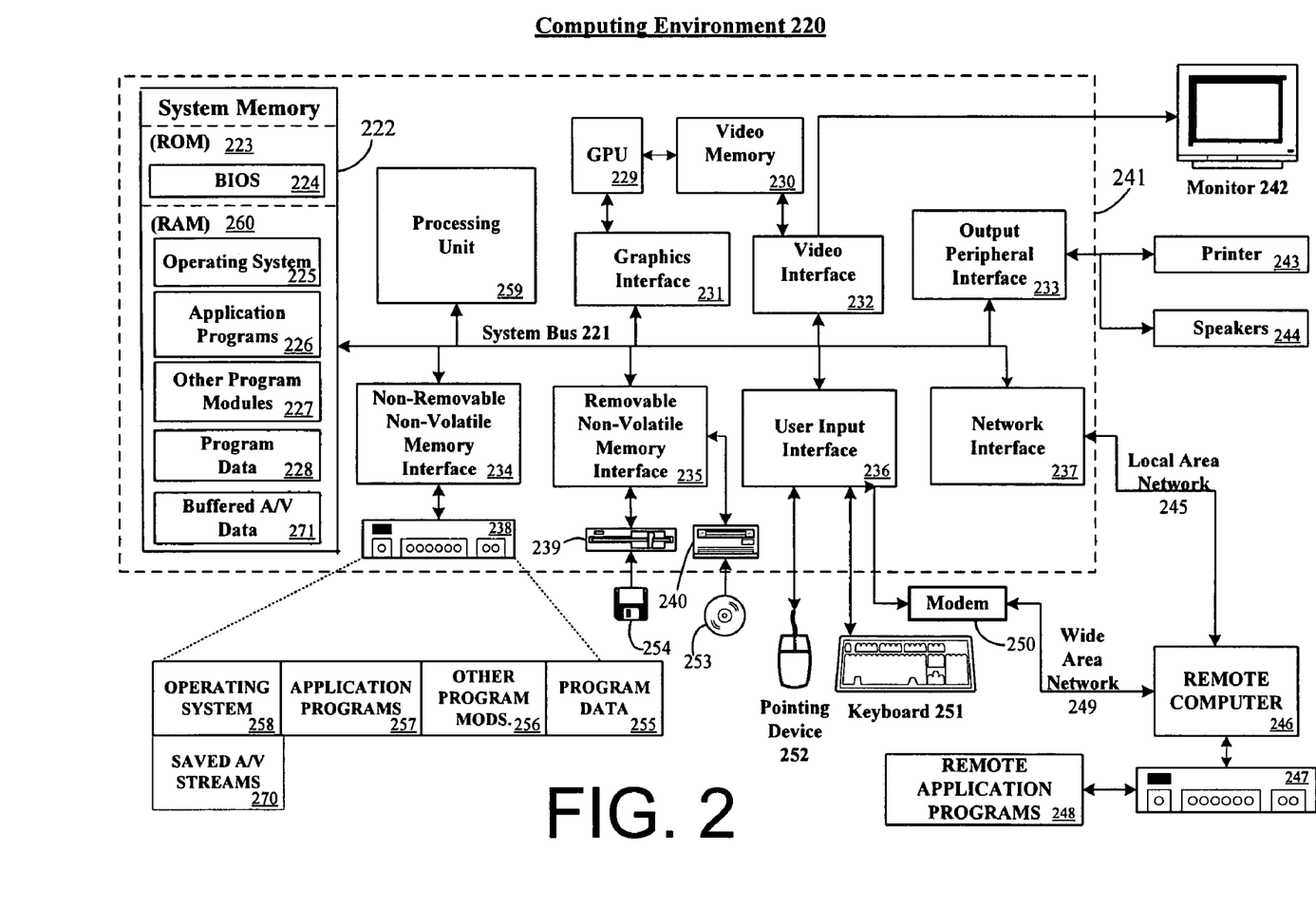
FIG. 2 illustrates a computing environment suitable for deployment of a file system as described herein.

FIG. 2 illustrates an exemplary computing system environment 220, for example, as may be used to implement aspects of client 120. FIG. 2 provides only one example of a suitable computing environment and is not intended to suggest any limitation as to the scope of use or functionality of the invention. Neither should the computing environment 220 be interpreted as having any dependency or requirement relating to any one or combination of components illustrated in the exemplary computing environment 220.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, aspects of an exemplary computing environment may include a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, program data 228, and buffered A/V data 271.

The computer 241 may also include other removable/non-removable, volatile/nonvolatile computer storage media. By way of example only, FIG. 2 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2 provide storage of computer readable instructions, data structures, program modules and other data for the computer 241. In FIG. 2, for example, hard disk drive 238 is illustrated as storing operating system 258, application programs 257, other program modules 256, program data 255 (such as game data), and saved AV streams 270. Note that these components can either be the same as or different from operating system 225, application programs 226, other program modules 227, program data 228, and buffered A/V data 271. Operating system 258, application programs 257, other program modules 256, program data 255, and buffered A/V data 271 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2b. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2 illustrates remote application programs 248 as residing on memory device 247.

It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 3:
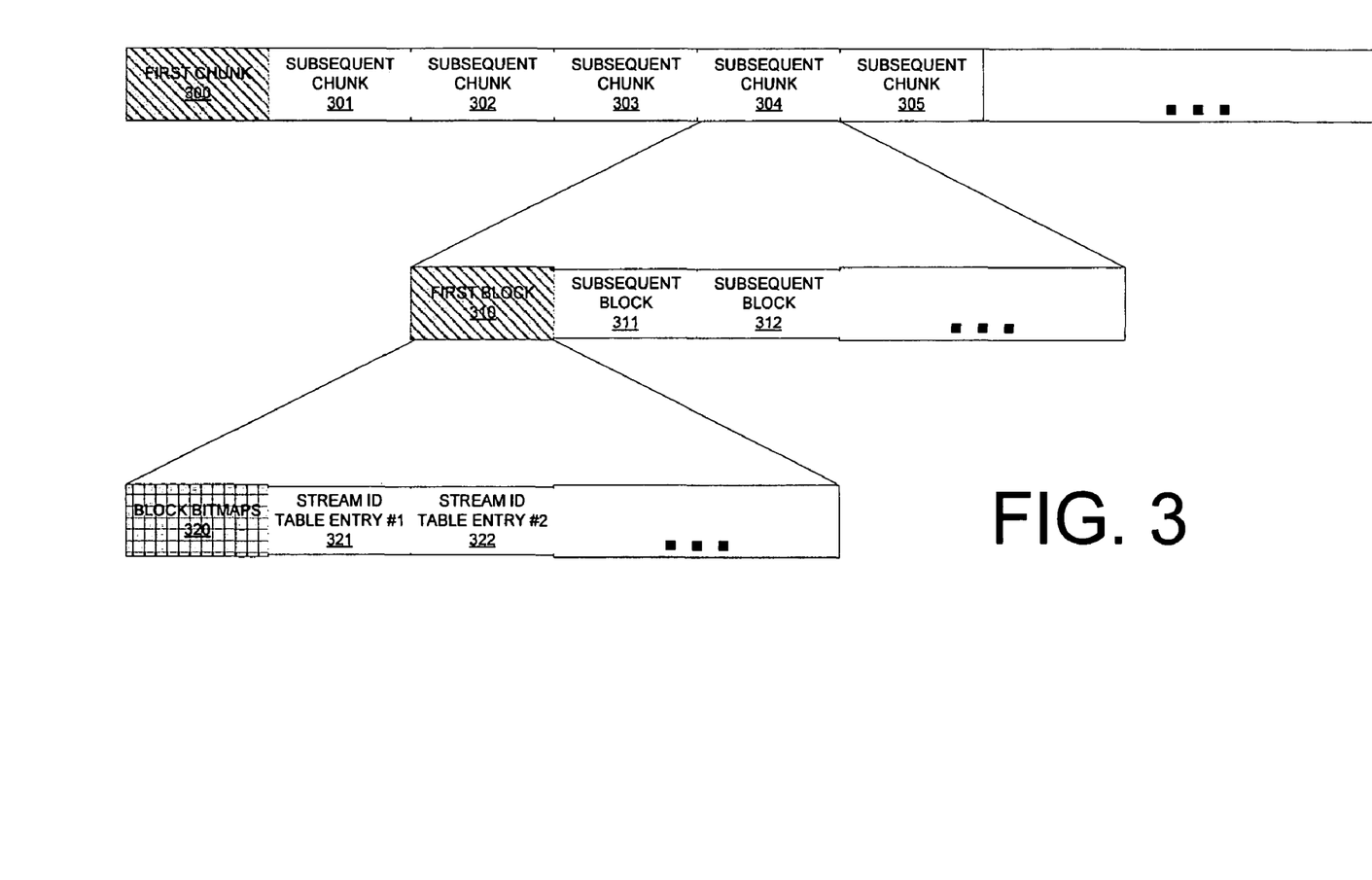
FIG. 3 illustrates a non-volatile memory volume comprising a plurality of chunks, and details one of the chunks as comprising a plurality of blocks, and further details contents of a first block.

FIG. 3 illustrates on-disk structures used to store information when utilizing the disclosed filesystem A filesystem is a set of interconnected components that depend on each other for proper operation. One component is a nonvolatile memory such as a disk, on which data is organized in a manner governed by the filesystem. Other components is the hardware and software configured to store data on, and retrieve data from, the disk.

As illustrated in FIG. 3, a computer system non-volatile memory such as a disk may be broken up into equal size "chunks," comprising a first chunk 300 and a number of subsequent chunks 301-305. The subsequent chunks 301-305 are then broken up into equal size "blocks," comprising a first block 310 and a number of subsequent blocks 311-312. The three dots illustrated to the right of chunk 305, block 312, and elsewhere in the figures indicate additional subsequent items. The chunks 300-305 may be for example 128 MB each, while the blocks 310-312 may be 128 KB each. In such an embodiment, there would be 1024 blocks per subsequent chunk. Streams are saved to disk in a sequence of subsequent blocks as described below. Blocks are addressed by a chunk index and block index within the corresponding subsequent chunk.

The first block 310 of every subsequent chunk 301-305 contains filesystem metadata. The subsequent blocks 311-312 contain stream data. The first chunk 300 on the disk is entirely reserved for filesystem metadata.

The first block 310 of every chunk 301-305 contains two forms of metadata: block bitmaps 320 and a stream index table with table entries 321, 322, etc. Stream index table entries 321, 322 each correspond to a block bitmap in 320.

Figure 4:
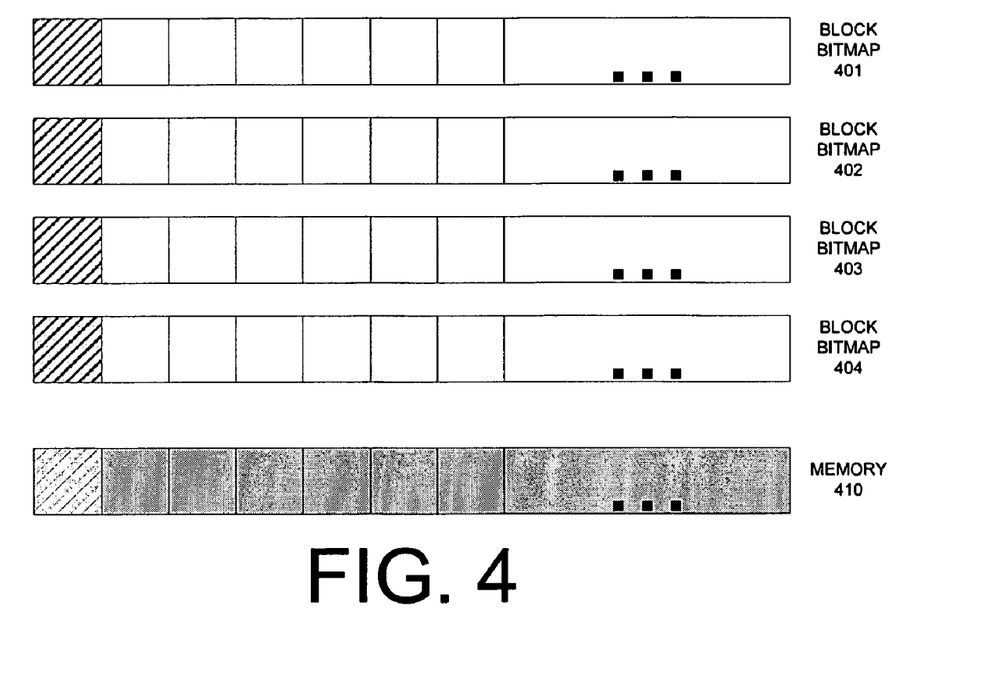
FIG. 4 illustrates four exemplary block bitmaps in an empty state, and a corresponding portion of active memory indicating available blocks in a subsequent chunk associated with the bitmaps.
Figure 5:
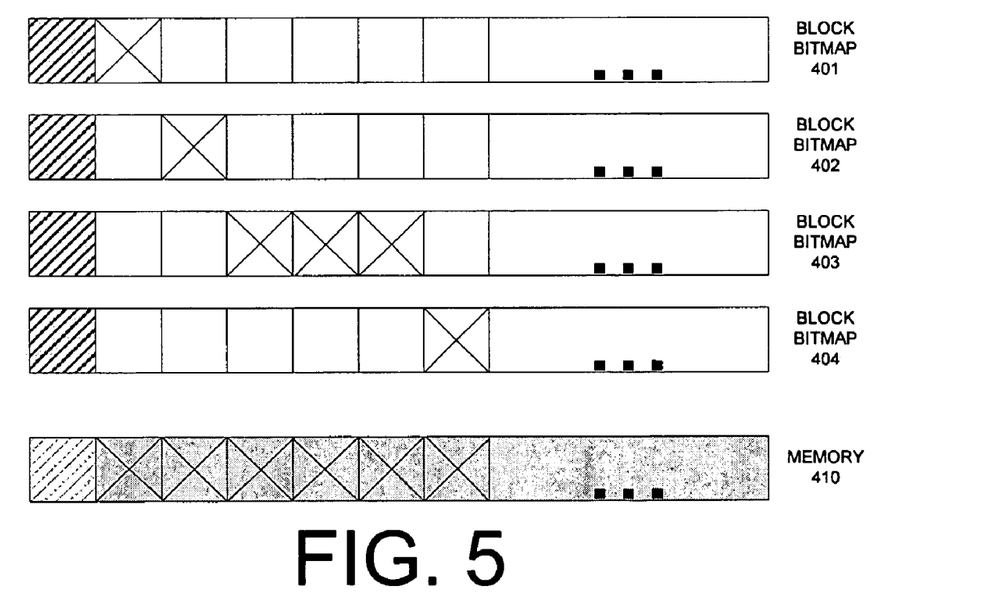
FIG. 5 illustrates the block bitmaps of FIG. 4, each block bitmap indicating blocks of the corresponding subsequent chunk that are allocated to a stream associated with the respective block bitmaps, and the corresponding portion of active memory.

Block bitmaps 320 are illustrated in greater detail in FIGS. 4 and 5. FIG. 4 shows a plurality of block bitmaps 401-404 that do not indicate any data is stored in the various subsequent blocks of the subsequent chunk. Note that the first bit on the far left of each bitmap is unavailable. This is because the first block of the chunk is reserved for metadata, as discussed above.

A memory bitmap 410 is also illustrated. The memory bitmap may be kept in active memory. The memory bitmap 410 combines the free/taken information from each block bitmap, thereby showing which blocks are still available in the chunk.

Referring now to FIG. 5, assume that stream A is assigned block bitmap 401, stream B is assigned block bitmap 402, stream C is assigned block bitmap 403, and stream D is assigned block bitmap 404. These assignments are made by placing corresponding entries in the stream index table described above.

Data for stream A is written to the first subsequent block. To indicate this, the first bit in block bitmap 401 is flipped. A bit in the memory bitmap 410 may also be flipped.

When the filesystem next wishes to write data for stream B, it sees from the block bitmap metadata that the first subsequent block is taken, but the second subsequent block is not. So data for stream B is written to the second subsequent block. Similarly, data for stream C may be written to the third through fifth subsequent block, and data for stream D may be written to the sixth subsequent block. If one or more streams is subsequently deleted, those bitmaps can be reset, and new streams can be written to the available blocks.

The block bitmaps thus illustrates indicate which blocks are allocated within a chunk to a particular stream. The streams to which each block bitmap is relevant is stored in the stream index table. Multiple block bitmaps may be relevant to the same stream. This allows the same chunk to be used multiple times within the same stream. The stream index table can be implemented as transactional, so that any changes to it either commit or are rolled back as a logical unit. This can be accomplished by keeping a backup copy of the stream index table entries, so that should a problem occur in the middle of a transaction, the state of the table prior to the problem can be restored.

Figure 6:
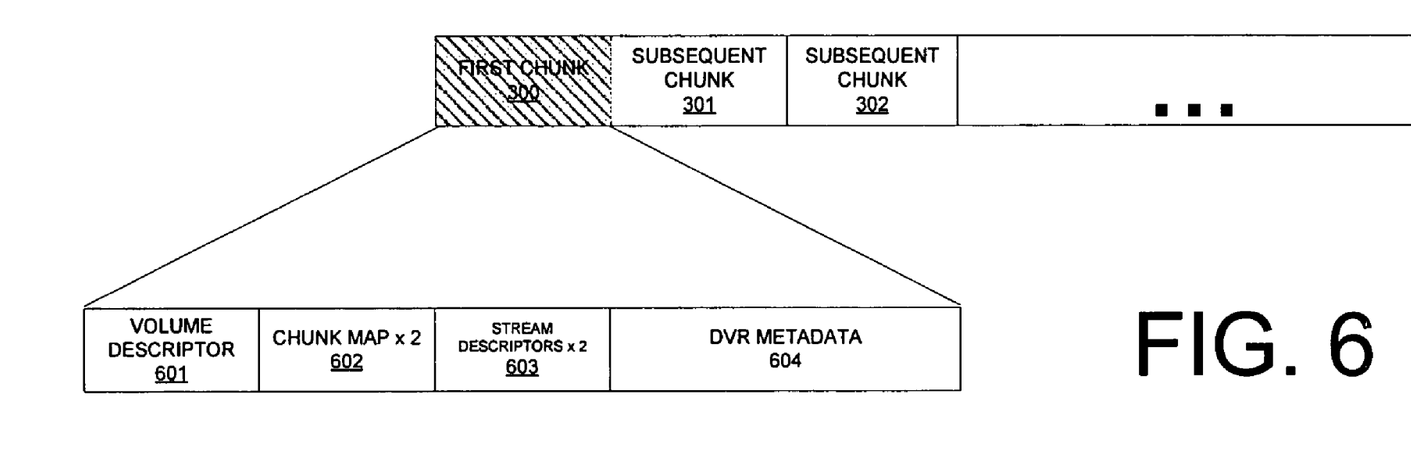
FIG. 6 illustrates a non-volatile memory volume comprising a plurality of chunks, and details a first chunk as comprising volume metadata.

FIG. 6 illustrates contents of the first chunk 300 on the disk. The first chunk 300 contains several forms of metadata. The volume descriptor 601, transactional chunk map 602, transactional stream descriptors 603, and DVR per-stream metadata 604.

The volume descriptor 601 contains information related to the size of the managed space, e.g. the total size of the hard drive (volume size), a unique volume identifier, a chunk map slot location, and/or a hash of the first chunk.

The transactional chunk map 602 details the streams that reside within each subsequent chunk, the total number of bitmaps used, as well as the total number of blocks used. The chunk map may be "transactional" by keeping a backup copy of the data as described above.

The stream descriptors 603 contain the stream size, date information, and a sequential list of {chunk index, block bitmap index, number of blocks used} tuples. As mentioned, the stream descriptors may also be "transactional" by keeping a backup copy of the data as described above. The transactional nature of certain aspects of the filesystem disclosed herein makes the filesystem fault tolerant.

The above describes the data structures stored on the disk. The following description of FIGS. 7-10 provides the general operation of the filesystem. FIGS. 7-10 indicate methods as may be performed by file system electronics. The operation of the filesystem may be controlled by appropriate hardware and software. As such, FIGS. 7-10 may also be construed as instructions as may be encoded onto a computer readable medium and/or hardware components configured to carry out the specified task.

Formatting the filesystem simply requires writing zero to the first chunk of the disk, with the exception of the chunk map hashes that should contain the hash of all zeros. To mount the filesystem, the most recent consistent chunk map is read into memory. From that point onward, filesystem operations such as create, delete, write, and read determine how the filesystem is manipulated.

Figure 7:
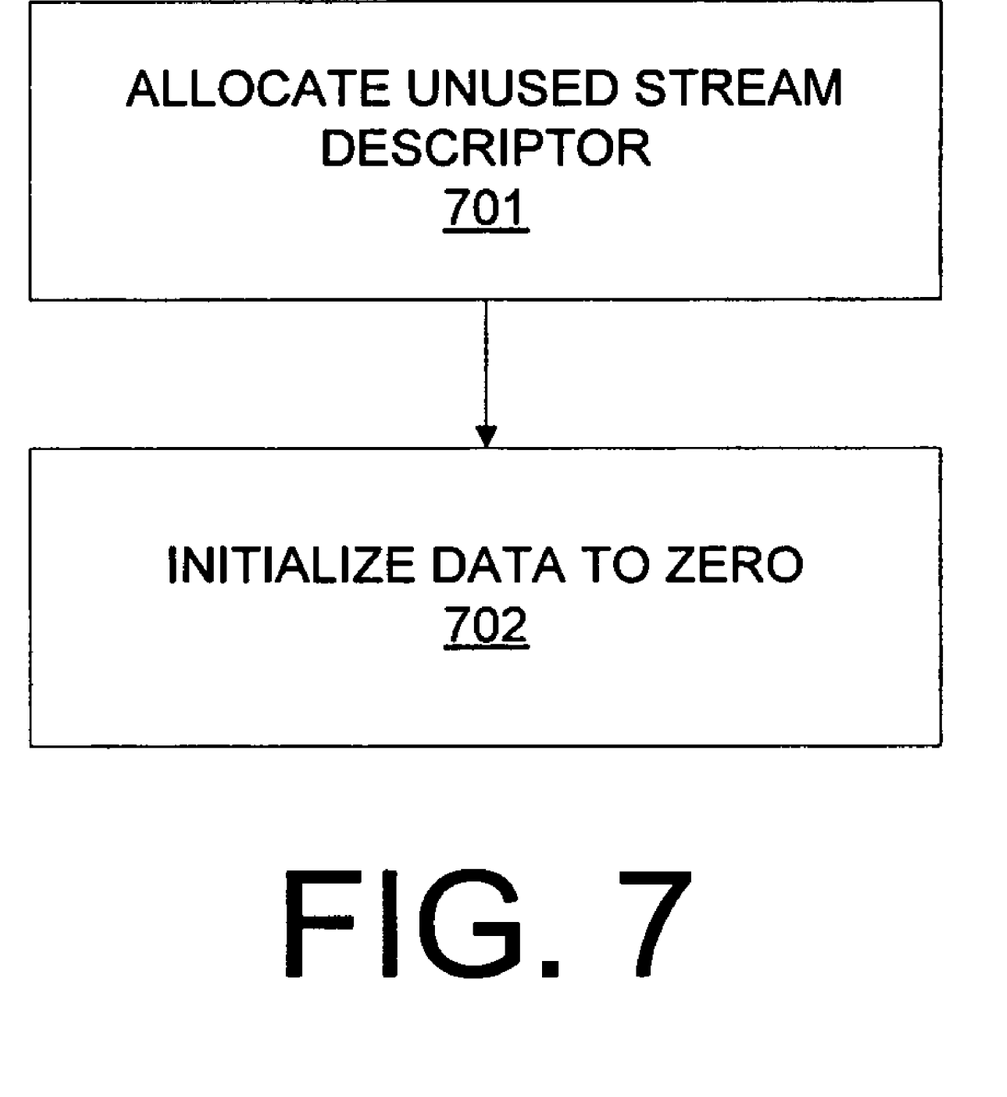
FIG. 7 illustrates a process for creating a file as may be carried out by a computer system using the file system disclosed herein.

FIG. 7 illustrates creation of a file by allocating an unused stream descriptor 701 in the first chunk, and initializing its data to zero 702.

An affinity index may be utilized when writing a stream. An affinity index is an ephemeral value used per stream while the stream is being written by an application to denote groups of streams to write into the same chunk. This enables the DVR to interleave types of information together. For instance, the DVR can use this feature to interleave AV stream information together for four different AV streams, while interleaving AV stream time index information together separately. This feature allows for simultaneous, high-speed writing of streams. Also by placing streams of roughly the same size together, long disk seeks for smaller units of stream data (such as stream index information) are avoided. By interleaving only certain data, other data, e.g. data from the index stream, is excluded from interleaving with the interleaved streams, such as the audio and video streams.

Figure 8:
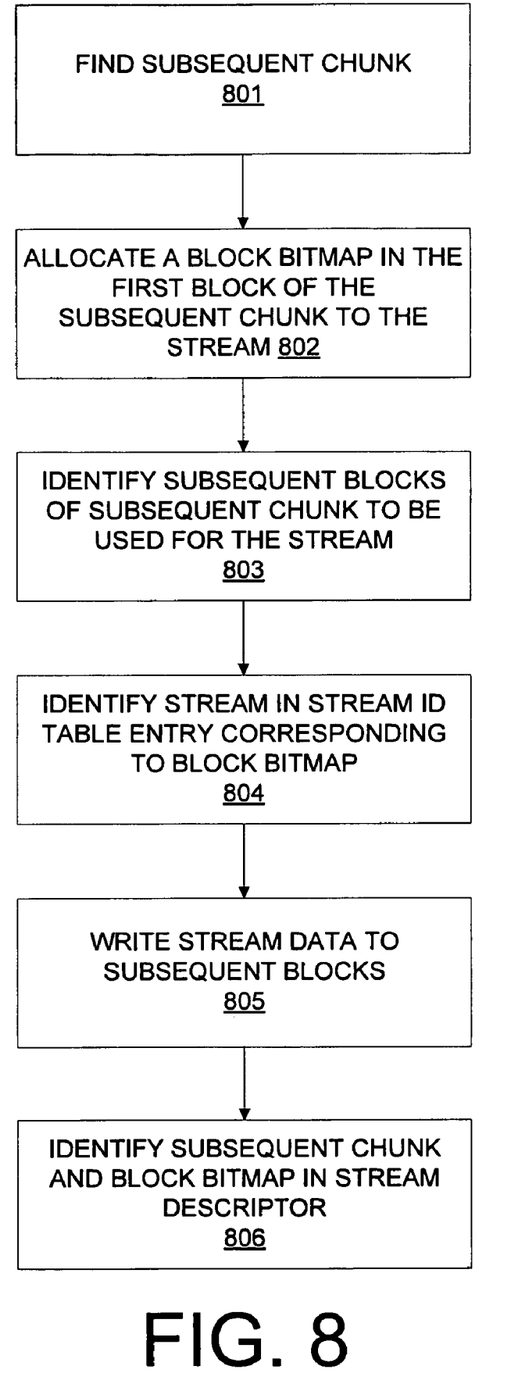
FIG. 8 illustrates a process for writing stream data to a non-volatile memory as may be carried out by a computer system using the file system disclosed herein.

FIG. 8 illustrates writing to a stream. A subsequent chunk is chosen 801. The subsequent chunk may be one that contains a minimal amount of free space. If no chunk had previously been chosen with a specified affinity index, the chunk with the lowest chunk index that meets the free space requirement is chosen. If a chunk had been previously chosen for a write (and assigned the requested affinity index), the previously chosen chunk is preferred, unless it does not contain enough free space. If it does not contain enough free space, the next chunk (in chunk index order) that meets the free space criteria and is not already assigned an affinity index is chosen. The free space requirement includes of having at least one block bitmap free, as well as having a stream entry in the chunk map either free, or having a stream entry that already contains the requested stream index.

If a new subsequent chunk is chosen, a block bitmap in the new subsequent chunk is allocated 802. Subsequent blocks of the subsequent chunk used for the stream are identified in the block bitmap 803. The stream is identified in a stream ID table entry corresponding to the bitmap 804. Stream data is written to subsequent blocks 805. Also, a next chunk tuple in the stream descriptor is used to indicate its use in the stream 806. The stream index table of the subsequent chunk is also updated.

Figure 9:
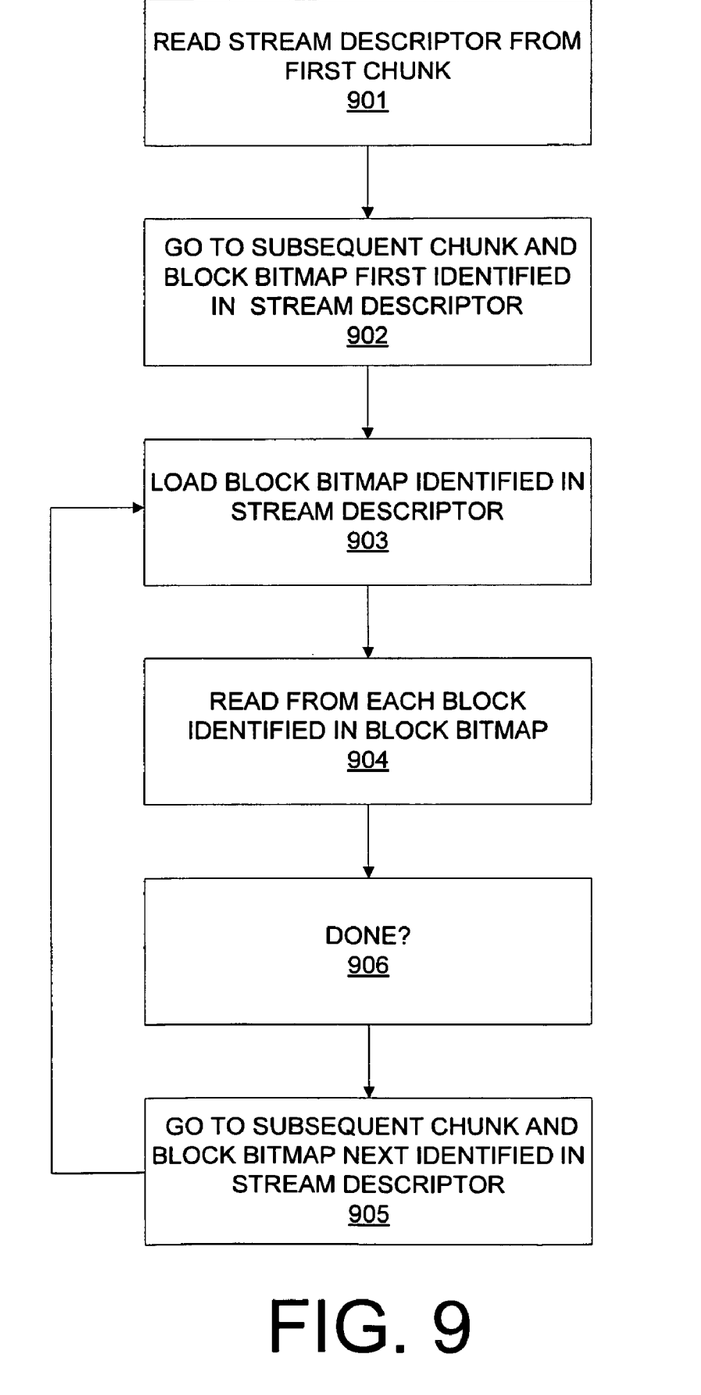
FIG. 9 illustrates a process for reading stream data from a non-volatile memory as may be carried out by a computer system using the file system disclosed herein.

FIG. 9 illustrates reading a stream. To read a stream, the stream descriptor's chunk tuples are read from the first chunk 901, and sequentially followed, e.g., by first going to a subsequent chunk and block bitmap first identified in the stream descriptor 902. The specified block bitmap from the tuple is loaded 903 and used to iterate through each block used by the stream 904. If not done 906, then the next subsequent chunk and block bitmap identified in the stream descriptor is located 906, and steps 903-906 are repeated. To seek to a particular position in the stream, it is required to iterate through the stream descriptor's chunk tuples to find the appropriate chunk for that position.

Figure 10:
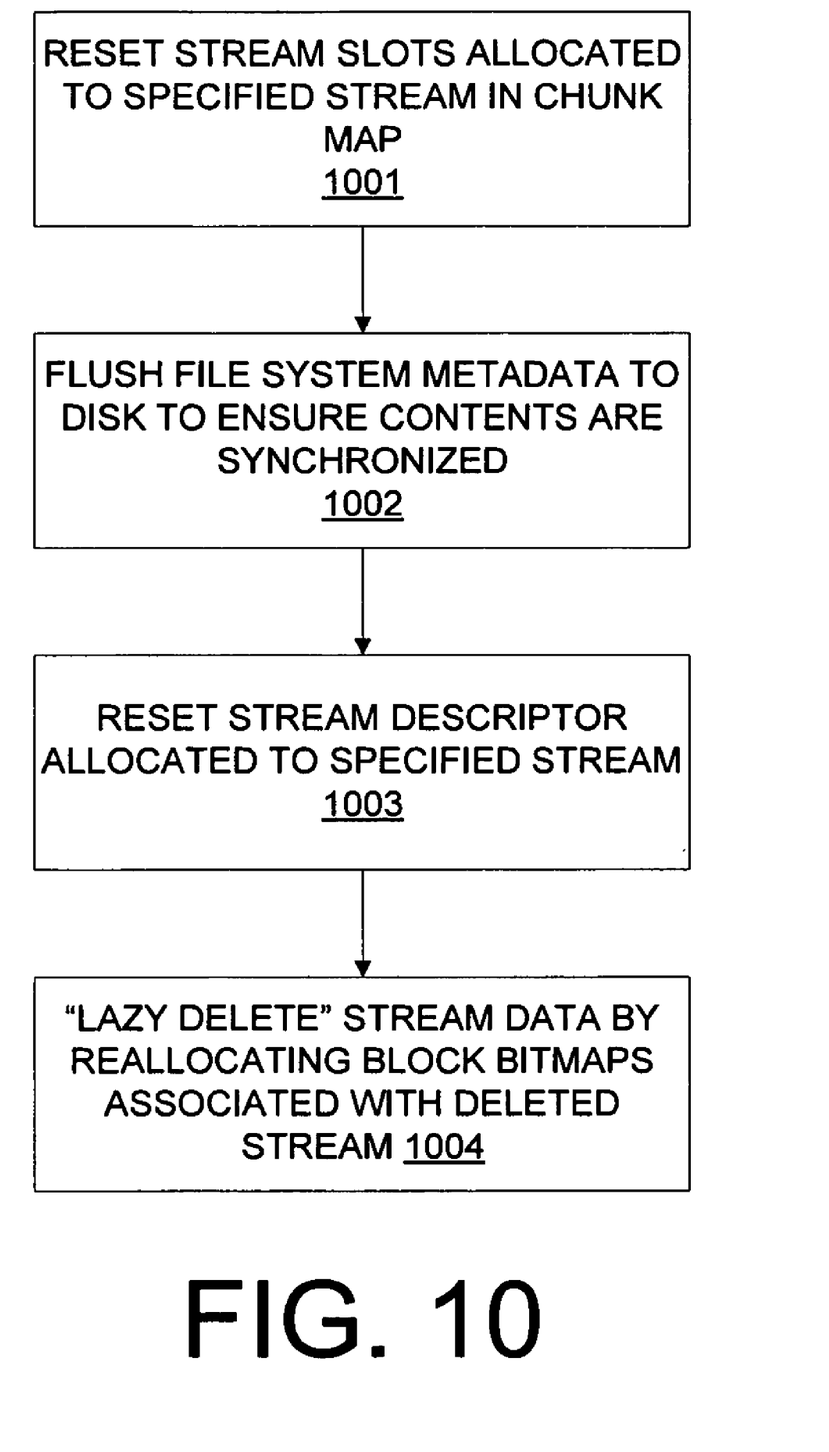
FIG. 10 illustrates a process for deleting stream data from a non-volatile memory as may be carried out by a computer system using the file system disclosed herein.

FIG. 10 illustrates deleting a stream. To delete a stream, the chunk map is searched for chunks that have any stream slots allocated to the specified stream descriptor. These stream slots are reset to zero 1001. After this, filesystem metadata is flushed to disk to ensure the disk contents are synchronized 1002. After this, the stream descriptor is reset to zero and saved to disk 1003. The actual stream data can be "lazy" deleted by reallocating block bitmaps associated with the deleted stream 1004. The deletion of a stream is thus advantageously a fixed time operation for the filesystem disclosed herein.

Filesystem metadata is flushed in a specific order to ensure disk contents remain consistent, or is at least recoverable should a fault occur during the flush. For each loaded chunk, loaded block bitmaps are flushed first, after which the stream index table is flushed. After all chunks are flushed, the stream descriptors are flushed. Finally, the chunk map and an updated copy of the volume descriptor is saved.

One advantage of the filesystem described herein is that it can reduce disk seeks by keeping metadata in memory. It also further minimizes seeks by "interleaving" data from different streams in the same portion of the disk.

In one embodiment, regularly scheduled metadata flushes are designed to be at up to a very low frequency (e.g. several minutes or more) in order to minimize head seeks, at the file system is designed such that if data is written but the metadata is not flushed for several minutes and power is lost, only the several minutes of data is lost (i.e. the last few minutes of a recording) but the file system remains otherwise intact.

Furthermore, to counteract the impact of long-term user actions of recording and deleting streams (recordings), the filesystem can be configured to rearrange data so as to create larger segments of contiguous free space while no recordings are taking place. This is similar, but not identical to, defragmentation schemes implemented by other filesystems. In one embodiment, the filesystem disclosed herein can automatically periodically defragment the disk volume.

The novel two-tiered allocation scheme allows the filesystem disclosed herein to have a low memory profile. Specifically, the two-tiered allocation scheme comprises the chunks of a first size that are each divided into blocks of a smaller size, wherein metadata is stored in a first chunk as well as a first block of each subsequent chunk.

In light of the diverse computing environments that may be built according to the general framework described herein, the systems and methods provided herein cannot be construed as limited in any way to a particular computing architecture. Instead, the present invention should not be limited to any single embodiment, but rather should be construed in breadth and scope in accordance with the appended claims.

The invention claimed is:

1. A computer system comprising:
    a non-volatile memory comprising a plurality of equal size chunks;
        a first chunk comprising filesystem metadata, wherein said filesystem metadata comprising a stream descriptor, and said stream descriptor comprising at least one stream size and a sequential list of {chunk identifier, block bitmap identifier, number of blocks used} tuples;
        a plurality of subsequent chunks, said subsequent chunks comprising a plurality of equal size blocks;
        a first block of each subsequent chunk entirely reserved for block metadata comprising at least one block bitmap and a stream index table, said at least one block bitmap indicating blocks in said subsequent chunk that contain stream data for a first stream, and said stream index table comprising a stream identifier for said first stream;
        a plurality of subsequent blocks of said subsequent chunk, at least one of said subsequent blocks comprising stream data for said first stream; and
    a processor that processes the plurality of equal size chunks from the non-volatile memory.

2. The computer system of claim 1, said filesystem metadata comprising one or more of a volume descriptor, a chunk map, said stream descriptor, and stream metadata.

3. The computer system of claim 2, said filesystem metadata comprising said chunk map and stream descriptor, and further comprising a second copy of said chunk map and a second copy of said stream descriptor.

4. The computer system of claim 2, said filesystem metadata comprising said volume descriptor, and said volume descriptor comprising one or more of a volume size, a unique volume identifier, a chunk map slot location, and a hash of said first chunk.

5. The computer system of claim 2, said filesystem metadata comprising said chunk map, and said chunk map comprising a stream identifier for said first stream, a number of bitmaps used in said subsequent chunk, and a number of blocks used in said subsequent chunk.

6. The computer system of claim 1, said computer system further comprising a computer readable medium comprising computer executable instructions that are executed by the processor for automatically defragmenting said non-volatile memory.

7. The computer system of claim 1, said computer system further comprising a computer readable medium comprising computer executable instructions that are executed by the processor for interleaving data from said first stream and at least a second stream among said plurality of subsequent blocks.

8. The computer system of claim 7, said computer readable medium further comprising computer executable instructions that are executed by the processor for excluding data from at least a third stream from interleaving with said first stream and said at least a second stream.

9. The computer system of claim 1, said filesystem metadata comprising a chunk map, and said computer system further comprising a computer readable medium comprising computer executable instructions that are executed by the processor for mounting a file system by copying said chunk map into a volatile memory.

10. The computer system of claim 1, said computer system further comprising a computer readable medium comprising computer executable instructions that are executed by the processor for creating a file by allocating an unused stream identifier in said stream descriptor, and initializing data associated with said unused stream identifier to zero.

11. The computer system of claim 1, said computer system further comprising a computer readable medium comprising computer executable instructions that are executed by the processor for selecting a chunk that contains a minimal amount of free space when writing to a stream.

12. A computer system of claim 1, said computer system further comprising a computer readable medium comprising computer executable instructions that are executed by the processor for determining that free space is available in a chunk when at least one block bitmap associated with said chunk is free, and at least one entry in a stream identifier table associated with said chunk is either free or contains a stream identifier for a stream that is currently being written.

13. The computer system of claim 1, said computer system further comprising a computer readable medium comprising computer executable instructions that are executed by the processor for reading a stream by sequentially following said tuples.

14. The computer system of claim 1, said filesystem metadata comprising a chunk map, and said computer system further comprising a computer readable medium comprising computer executable instructions that are executed by the processor for deleting a stream by resetting stream slots in said chunk map to zero.

15. The computer system of claim 1, said computer system further comprising a computer readable medium comprising computer executable instructions that are executed by the processor for flushing file system metadata by copying one or more block bitmaps, a stream identifier table, a stream descriptor, and one or more chunk maps to a nonvolatile memory.

16. The computer system of claim 1, wherein said computer system is configured to serve Digital Video Recorder (DVR) functions.

17. The computer system of claim 16, wherein said computer system is further configured to serve general purpose computing functions.

18. The computer system of claim 16, wherein said computer system is further configured to serve video gaming functions.

19. A method for creating a file and writing stream data to a nonvolatile memory, comprising:
creating a file by allocating to a first stream an unused stream descriptor located in a first chunk of said nonvolatile memory wherein said stream descriptor comprising a stream size and a sequential list of {chunk identifier, block bitmap identifier, number of blocks used} tuples and wherein the first chunk is entirely reserved for filesystem metadata and a first block within the first chunk is entirely reserved for block metadata, and initializing data in said unused stream descriptor to zero;
finding a subsequent chunk in said nonvolatile memory that has both a lowest chunk index number and meets a free space requirement;
said free space requirement providing that a block bitmap located in a first block of said subsequent chunk is free, and an entry in a stream identifier table located in said first block is either free or contains a stream identifier for said first stream;
allocating said block bitmap to said first stream;
identifying in said block bitmap subsequent blocks of said subsequent chunk that are designated to said first stream;
writing first stream data to said subsequent blocks of said subsequent chunk; and
identifying said subsequent chunk and said block bitmap in said stream descriptor.

20. A method for reading stream data from a nonvolatile memory, comprising:
reading a stream descriptor located in a first chunk of said nonvolatile memory wherein the first chunk is entirely reserved for filesystem metadata and a first block within the first chunk is entirely reserved for block metadata, said stream descriptor comprising a stream size and a sequential list of {chunk identifier, block bitmap identifier, number of blocks used} tuples;
sequentially reading from one or more subsequent chunks of said nonvolatile memory that are identified by chunk identifiers in said tuples, wherein reading from a subsequent chunk comprises loading an identified block bitmap from a first block of the subsequent chunk into a volatile memory; and
reading stream data from any subsequent blocks of the subsequent chunk that are identified in said identified block bitmap.

* * * * *